United States Patent
Li et al.

(10) Patent No.: US 12,271,889 B2
(45) Date of Patent: Apr. 8, 2025

(54) FARE PAYMENT

(71) Applicant: Advanced New Technologies Co., Ltd., George Town (KY)

(72) Inventors: Jiajia Li, Hangzhou (CN); Fen Zhai, Hangzhou (CN); Fei Ni, Hangzhou (CN); Jiao Lu, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 389 days.

(21) Appl. No.: 16/888,504

(22) Filed: May 29, 2020

(65) Prior Publication Data

US 2021/0224784 A1    Jul. 22, 2021

Related U.S. Application Data

(63) Continuation of application No. PCT/CN2019/071689, filed on Jan. 15, 2019.

(30) Foreign Application Priority Data

Jan. 31, 2018 (CN) .......................... 201810093234.3

(51) Int. Cl.
   *G06Q 20/30* (2012.01)
   *G06Q 20/10* (2012.01)
   (Continued)

(52) U.S. Cl.
   CPC ....... *G06Q 20/3278* (2013.01); *G06Q 20/108* (2013.01); *G06Q 20/326* (2020.05);
   (Continued)

(58) Field of Classification Search
   CPC ........... G06Q 20/20; G06Q 20/32; H04B 5/00
   See application file for complete search history.

(56) References Cited

U.S. PATENT DOCUMENTS

| 10,223,674 B2 * | 3/2019 | Itwaru .................. G06Q 20/14 |
| 2002/0040355 A1 * | 4/2002 | Weiner .................. G06Q 20/28 |
| | | 705/412 |

(Continued)

FOREIGN PATENT DOCUMENTS

| CN | 105550868 | 5/2016 |
| CN | 105631655 | 6/2016 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Steven S Kim
*Assistant Examiner* — Sima Asgari
(74) *Attorney, Agent, or Firm* — Fish & Richardson P.C.

(57) ABSTRACT

Implementations of the present specification disclose a fare payment method, apparatus, and device. In one aspect, the method includes: receiving, at a terminal device supporting host-based card emulation (HCE), an HCE-based routing instruction from a fare collection device of a public transportation system; establishing, by the terminal device, a near field communication (NFC) connection with the fare collection device in response to the routing instruction; and transmitting, by the terminal device, payment-related information of a user of the terminal device to the fare collection device through the NFC connection, wherein the payment-related information is to be verified by the fare collection device, and wherein the fare collection device is configured to: verify the received payment-related information of the user; and in response to a successful verification, deduct a fare from an account of the user based on the payment-related information.

15 Claims, 3 Drawing Sheets

(51) Int. Cl.

| | | |
|---|---|---|
| *G06Q 20/32* | (2012.01) | |
| *G06Q 20/40* | (2012.01) | |
| *G06Q 50/40* | (2024.01) | |
| *G07B 15/02* | (2011.01) | |
| *H04W 4/80* | (2018.01) | |
| *H04W 8/18* | (2009.01) | |
| *H04W 12/033* | (2021.01) | |
| *H04W 76/10* | (2018.01) | |

(52) U.S. Cl.
CPC .......... *G06Q 20/401* (2013.01); *G06Q 50/40* (2024.01); *G07B 15/02* (2013.01); *H04W 4/80* (2018.02); *H04W 8/18* (2013.01); *H04W 12/033* (2021.01); *H04W 76/10* (2018.02); *G06Q 2220/00* (2013.01); *G06Q 2240/00* (2013.01)

(56) References Cited

U.S. PATENT DOCUMENTS

| | | | |
|---|---|---|---|
| 2005/0085251 A1* | 4/2005 | Kaminski | H04L 1/0007 455/510 |
| 2012/0310720 A1* | 12/2012 | Balsan | G06Q 20/204 705/14.26 |
| 2015/0262164 A1 | 9/2015 | Ranganathan et al. | |
| 2016/0099759 A1* | 4/2016 | Poon | H05K 999/99 455/41.1 |
| 2017/0048655 A1 | 2/2017 | Kwon | |
| 2017/0330188 A1* | 11/2017 | Canh | G06Q 20/385 |
| 2018/0276666 A1* | 9/2018 | Haldenby | G06Q 20/20 |
| 2019/0363889 A1* | 11/2019 | Wang | H04L 9/0643 |

FOREIGN PATENT DOCUMENTS

| | | |
|---|---|---|
| CN | 105787727 A | 7/2016 |
| CN | 105847292 | 8/2016 |
| CN | 105976177 | 9/2016 |
| CN | 106296174 | 1/2017 |
| CN | 106327179 | 1/2017 |
| CN | 107038562 | 8/2017 |
| CN | 107256578 | 10/2017 |
| CN | 107408253 | 11/2017 |
| CN | 108492101 | 9/2018 |
| JP | H05266393 A | 10/1993 |
| JP | 2005266393 | 9/2005 |
| JP | 2011154695 | 8/2011 |
| JP | 2016170517 | 9/2016 |
| KR | 101317893 B1 | 10/2013 |
| KR | 20150112721 A | 10/2015 |
| KR | 101660674 B1 | 10/2016 |
| WO | WO 2013177416 | 11/2013 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/071689, dated Apr. 16, 2019, 11 pages (with partial English translation).

Akinyokun et al., "Security and Privacy Implications of NFC-enabled Contactless Payment Systems", In Proceedings of ARES '17, Reggio Calabria, Italy, 10 pages, 2017.

Extended European Search Report in Application No. 19748389.4, dated Oct. 20, 2020, 8 pages.

Ozdenizci et al., "A Tokenization-Based Communication Architecture for HCE-Enabled NFC Services", Hindawi Publishing Corporation, 2016, ID 5046284, 20 pages, 2016.

Pandy et al., ""Payment Strategies—Understanding the Role of HostCard Emulation in Mobile Wallets"", Federal Reserve Bank of Boston, 7 pages, 2016.

PCT Preliminary Report on Patentability in International Application No. PCT/CN2019/071689, dated Aug. 4, 2020, 13 pages (with English translation).

securetechalliance.org [online], "Host Card Emulation (HCE) 101," Aug. 2014, retreived from URL <https://www.securetechalliance.org/wp-content/uploads/HCE-101-WP-FINAL-081114-clean.pdf>, 32 pages.

\* cited by examiner

FARE PAYMENT

CROSS-REFERENCE TO RELATED APPLICATIONS

This application is a continuation of PCT Application No. PCT/CN2019/071689, filed on Jan. 15, 2019, which claims priority to Chinese Patent Application No. 201810093234.3, filed on Jan. 31, 2018, and each application is hereby incorporated by reference in its entirety.

TECHNICAL FIELD

The present specification relates to the field of information technologies, and in particular, to fare payment methods, apparatuses, and devices.

BACKGROUND

Currently, when a user takes a public transportation tool such as a subway or a bus, the user can pay a fare through QR (quick response) code verification.

Specifically, for example, a user takes a subway. When the user comes to a subway gate to prepare to enter a station, the user can use an application on a mobile phone to display a QR code including payment-related data information of the user to the subway gate, and the subway gate can obtain the payment-related data information of the user after scanning the QR code. Subsequently, the subway gate verifies the payment-related data information. If the verification succeeds, the subway gate can control the entrance to be open to allow the user to enter the station, and request a server to deduct a fare from an account corresponding to an account identifier included in the payment-related data information and pay the deducted fare to a subway management system.

SUMMARY

Implementations of the present specification provide fare payment methods, apparatuses, and devices, to alleviate a problem that an existing fare payment method is inconvenient for users.

To alleviate the previous technical problem, the implementations of the present specification are implemented as follows:

Implementations of the present specification provide a fare payment method, where an application is installed on a terminal device that supports host-based card emulation (HCE), and the method includes: receiving, by the application, an HCE-based routing instruction sent by an operating system of the terminal device, where the routing instruction is sent by a collection device of a public transportation system to the terminal device; establishing, by the application, a near field communication (NFC) connection with the collection device in response to the routing instruction; and transmitting payment-related data information of a user to the collection device by using the NFC connection, so that the collection device deducts a fare from an account of the user based on the payment-related data information after verification on the received payment-related data information succeeds.

Implementations of the present specification provide a fare payment method, including: sending, by a collection device of a public transportation system, an HCE-based routing instruction to a terminal device, so that an operating system of the terminal device sends the routing instruction to an application installed on the terminal device based on an application identifier of the application included in the routing instruction: establishing an NFC connection with the application in response to the routing instruction: receiving, by using the NFC connection, payment-related data information transmitted by the application; and verifying the payment-related data information; and if the verification succeeds, deducting a fare from an account of a user based on the payment-related data information.

Implementations of the present specification provide another fare payment method, where an application is installed on a terminal device that supports host-based card emulation (HCE), and the method includes: receiving, by an operating system of the terminal device, an HCE-based routing instruction sent by a collection device of a public transportation system; determining, based on an HCE function and an application identifier included in the routing instruction, the application that is installed on the terminal device and that corresponds to the application identifier; and sending the routing instruction to the determined application, so that the application establishes a near field communication (NFC) connection with the collection device based on the routing instruction, and transmits payment-related data information of a user to the collection device by using the NFC connection, so that the collection device deducts a fare from an account of the user based on the payment-related data information after verification on the received payment-related data information succeeds.

Implementations of the present specification provide a fare payment apparatus, where the apparatus is installed on a terminal device that supports host-based card emulation (HCE), and the apparatus includes: a first receiving module, configured to receive an HCE-based routing instruction sent by an operating system of the terminal device, where the routing instruction is sent by a collection device of a public transportation system to the terminal device: a connection module, configured to enable the apparatus to establish a near field communication (NFC) connection with the collection device in response to the routing instruction; and a transmission module, configured to transmit payment-related data information of a user to the collection device by using the NFC connection, so that the collection device deducts a fare from an account of the user based on the payment-related data information after verification on the received payment-related data information succeeds.

Implementations of the present specification provide another fare payment apparatus, including: a first sending module, configured to send an HCE-based routing instruction to a terminal device, so that an operating system of the terminal device sends the routing instruction to an application installed on the terminal device based on an application identifier of the application included in the routing instruction: a connection module, configured to establish an NFC connection with the application in response to the routing instruction: a receiving module, configured to receive, by using the NFC connection, payment-related data information transmitted by the application; and a verification module, configured to verify the payment-related data information; and if the verification succeeds, deduct a fare from an account of a user based on the payment-related data information.

Implementations of the present specification provide another fare payment apparatus, where an application is installed on a terminal device that supports host-based card emulation (HCE), and the apparatus includes: a receiving module, configured to receive an HCE-based routing instruction sent by a collection device of a public transportation system: a determining module, configured to determine, based on an HCE function and an application identifier included in the routing instruction, the application that is installed on the terminal device and that corresponds to the application identifier; and a sending module, configured to send the routing instruction to the determined application, so that the application establishes a near field communication (NFC) connection with the collection device based on the routing instruction, and transmits payment-related data information of a user to the collection device by using the NFC connection, so that the collection device deducts a fare from an account of the user based on the payment-related data information after verification on the received payment-related data information succeeds.

Implementations of the present specification provide a terminal device, where the terminal device supports host-based card emulation (HCE) and the terminal device includes one or more processors and memories, the memories store programs, and the programs are configured to be executed by the one or more processors to perform the following steps: receiving a routing instruction sent by a collection device of a public transportation system; establishing a near field communication (NFC) connection with the collection device in response to the routing instruction; and transmitting payment-related data information of a user to the collection device by using the NFC connection, so that the collection device deducts a fare from an account of the user based on the payment-related data information after verification on the received payment-related data information succeeds.

Implementations of the present specification provide a collection device, including one or more processors and memories, where the memories store programs, and the programs are configured to be executed by the one or more processors to perform the following steps: sending an HCE-based routing instruction to a terminal device, so that an operating system of the terminal device sends the routing instruction to an application installed on the terminal device based on an application identifier of the application included in the routing instruction; establishing an NFC connection with the application in response to the routing instruction; receiving, by using the NFC connection, payment-related data information transmitted by the application; and verifying the payment-related data information; and if the verification succeeds, deducting a fare from an account of a user based on the payment-related data information.

It can be seen from the previous technical solutions provided in the implementations of the present specification that, in the implementations of the present specification, an application can be pre-installed on a terminal device that supports HCE. When a user takes the ride, the user can move the terminal device to a vicinity of a collection device of a public transportation system. The collection device can send an HCE-based routing instruction to the terminal device, so that an operating system of the terminal device sends the routing instruction to the application based on an application identifier of the application included in the routing instruction, and then the application establishes an NFC connection with the collection device in response to the routing instruction. Then, the application can transmit payment-related data information to the collection device by using the NFC connection, so that the collection device can deduct a fare from an account of the user based on the payment-related data information after verification on the received payment-related data information succeeds. According to the implementations of the present specification, the user only needs to move the terminal device to a vicinity of the collection device without performing relatively complicated operations to cooperate with the collection device in scanning a QR code, and the application installed on the terminal device can transmit the payment-related data information to the collection device by using the NFC connection established with the collection device, to pay the fare. This is more convenient for users.

BRIEF DESCRIPTION OF DRAWINGS

To describe the technical solutions in the implementations of the present specification or in the existing technology more clearly, the following briefly describes the accompanying drawings needed for describing the implementations or the existing technology. Clearly, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

Currently, a collection device of a public transportation system can obtain payment-related data information of a user by scanning a QR code displayed by the user. The payment-related data information includes an account identifier of the user, and can be used to pay a fare. However, in this method, the user needs to perform relatively complicated operations: unlocking a terminal device screen, starting a specified application, triggering a QR code including payment-related data information in an interface of the specified application, and displaying the QR code to a collection device for scanning. Especially, when the light in a riding environment is relatively dark, the collection device scans the QR code at a low success rate, and therefore the user needs to make multiple attempts. Clearly, the existing fare payment method causes much inconvenience to users.

The technical solutions that claim protection in the present specification aim to enable a user to transmit payment-related data information to a collection device to pay a fare without displaying a QR code to the collection device. As such, the user does not need to perform the previous relatively complicated operations.

Specifically, the HCE technology can be used to implement card emulation of a terminal device without involvement of a security element (SE). When the terminal device is in an HCE mode, an application installed on the terminal device can establish an NFC connection with a collection device by using the terminal device, and transmit payment-related data information of a user to the collection device, to pay a fare.

To make a person skilled in the art better understand the technical solutions in the present specification, the following clearly and comprehensively describes the technical solutions in the implementations of the present specification with reference to the accompanying drawings in the one or more implementations of the present specification. Clearly, the described implementations are merely some rather than all of the implementations of the present specification. All other implementations obtained by a person of ordinary skill in the art based on the implementations of the present specification without creative efforts shall fall within the protection scope of the present specification.

The technical solutions provided in the implementations of the present specification are described in detail below with reference to the accompanying drawings.

Figure 1:
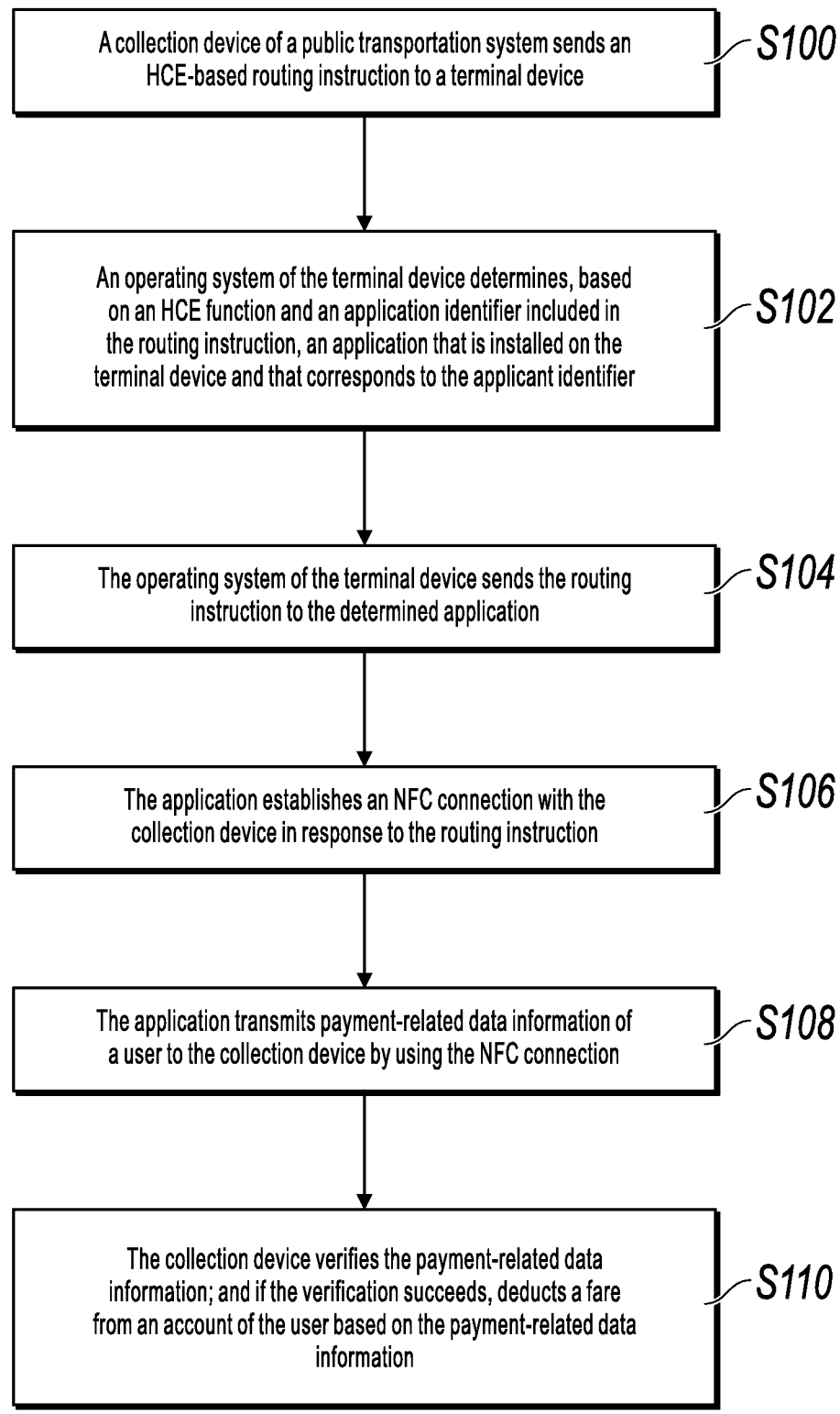
FIG. 1 is a flowchart illustrating a fare payment method, according to an implementation of the present specification.

FIG. 1 is a flowchart illustrating a fare payment method, according to an implementation of the present specification. The method includes the following steps.

S100. A collection device of a public transportation system sends an HCE-based routing instruction to a terminal device.

In implementations of the present specification, the public transportation system can be a management system of a public transportation institution such as a bus company or a subway company, and the collection device of the public transportation system can be a subway gate, a card reader on a bus, etc. The terminal device can be an intelligent device applicable to a mobile payment scenario, such as a mobile phone, a tablet computer, or a notebook computer of a user.

In implementations of the present specification, an NFC chip is built in each of the collection device and the terminal device. In addition, the terminal device should support HCE. Specifically, an Android system (such as a version later than Android 4.4) that supports HCE or another system that supports HCE can be installed on the terminal device.

It is worthwhile to note that the user needs to pre-set a mode of the terminal device to an HCE mode, to activate an HCE function of the terminal device. In addition, the user further needs to pre-install an application of a specified application developed based on HCE on the terminal device of the user. The specified application can be an application with a fare payment function that is developed based on HCE.

The application can pre-register an application identifier in an operating system of the terminal device. A management party of the application can pre-provide the application identifier for the public transportation system, and reaches such an agreement that the collection device of the public transportation system requests a grant from the terminal device to establish an NFC connection with the application corresponding to the application identifier when the collection device of the public transportation system detects that the terminal device in the HCE mode is in a vicinity of the collection device of the public transportation system.

As such, when the user takes the ride, the user can move the terminal device to a vicinity of the collection device. When a distance between the collection device and the terminal device is not greater than an NFC sensing distance (usually 10 cm), the collection device can detect the terminal device in the HCE mode, and the collection device sends the HCE-based routing instruction to the terminal device. The routing instruction includes the application identifier of the application.

S102. The operating system of the terminal device determines, based on the HCE function and the application identifier included in the routing instruction, the application that is installed on the terminal device and that corresponds to the application identifier.

S104. The operating system of the terminal device sends the routing instruction to the determined application.

After receiving the routing instruction sent by the collection device, the operating system of the terminal device determines whether the application identifier included in the routing instruction exists in registered application identifiers; and if the application identifier included in the routing instruction exists in the registered application identifiers, forwards the routing instruction to the application corresponding to the application identifier included in the routing instruction; or if the application identifier included in the routing instruction does not exist in the registered application identifiers, returns a failure result to the collection device.

S106. The application establishes an NFC connection with the collection device in response to the routing instruction.

It is worthwhile to note that establishment of the NFC connection does not depend on the Internet or a local area network. Therefore, when both the terminal device and the collection device are offline, the application can still establish the NFC connection with the collection device.

S108. The application transmits payment-related data information of the user to the collection device by using the NFC connection.

S110. The collection device verifies the payment-related data information; and if the verification succeeds, deducts a fare from an account of the user based on the payment-related data information.

In implementations of the present specification, the payment-related data information is information that is provided by the user for the collection device for verification to settle a fare when the user takes the ride. After the verification on the payment-related data information succeeds, the collection device usually deducts the fare from the account of the user based on the payment-related data information. Specifically, the collection device can send an account identifier of the user that is included in the verified payment-related data information to a server corresponding to the application, so that the server deducts the fare from the account corresponding to the account identifier, and pays the deducted fare to the public transportation system. It is worthwhile to emphasize that the collection device can verify the received payment-related data information in an offline state. When the collection device is connected to a network, the collection device requests a grant from the server to deduct the fare from the account of the user.

In the existing technology, the payment-related data information is usually converted into a QR code, and the collection device can obtain the payment-related data information by scanning the QR code. However, in implementations of the present specification, the user does not need to use the application on the terminal device to display a QR code for scanning by the collection device. Instead, the application directly transmits the payment-related data information to the collection device by using the established NFC connection.

It is worthwhile to note that the payment-related data information of the user usually includes the account identifier of the user and other related information (such as a serialized number of a public transportation system that acknowledges the validity of the payment-related data information, a validity period of the payment-related data information, and identity information of the user). The payment-related data information needs to be signed by using a private key of the user, and further needs to be signed by using a private key of the public transportation system that is agreed by the management party of the application in advance. After receiving the payment-related data information of the user, the collection device mainly verifies the signatures of the user and the public transportation system. If the verification succeeds, it means that the validity of the payment-related data information has been acknowledged by the user and the public transportation system.

It is worthwhile to further note that the private key of the user needed for generating the payment-related data information of the user usually has a validity period. When the application generates the payment-related data information based on payment-related data of the user, if the application determines that the stored private key of the user is invalid, the application can generate the payment-related data information after obtaining a valid private key of the user.

In the fare payment method shown in FIG. 1, an application can be pre-installed on a terminal device that supports HCE. When a user takes the ride, the user can move the terminal device to a vicinity of a collection device of a public transportation system. The collection device can send an HCE-based routing instruction to the terminal device, so that an operating system of the terminal device sends the routing instruction to the application based on an application identifier of the application included in the routing instruction, and then the application establishes a near field communication (NFC) connection with the collection device in response to the routing instruction. Then, the application can transmit payment-related data information to the collection device by using the NFC connection, so that the collection device can deduct a fare from an account of the user based on the payment-related data information after verification on the received payment-related data information succeeds.

In the method shown in FIG. 1, the user does not need to perform the following relatively complicated operations: unlocking a terminal device screen, starting a specified application, triggering a QR code including payment-related data information in an interface of the specified application, and displaying the QR code to a collection device for scanning. The user only needs to move the terminal device to a vicinity of the collection device, and the application installed on the terminal device can transmit the payment-related data information to the collection device by using the NFC connection established with the collection device, to pay the fare. This is more convenient for users.

In addition, in implementations of the present specification, impact of a light condition can be precluded. Regardless of the light condition, the terminal device can successfully transmit the payment-related data information to the collection device for verification, so that a problem of a low success rate of code scanning in the existing technology does not occur.

In addition, in implementations of the present specification, the application can obtain the payment-related data information of the user by using the following several methods, and when the user moves the terminal device to a vicinity of the collection device, the application transmits the obtained payment-related data information to the collection device by using the established NFC connection.

1. The application obtains the payment-related data information of the user from the server corresponding to the application. In this case, the terminal device needs to be in an online state, so that the application exchanges data with the server. The payment-related data information is actually generated by the server based on the voucher-related data of the user. The voucher-related data of the user is data used to generate the payment-related data information. The voucher-related data of the user can specifically include the account identifier of the user, the previously described other related information (such as the serialized number of the public transportation system that acknowledges the validity of the payment-related data information, the validity period of the payment-related data information, and the identity information of the user), the private key of the user, the private key of the public transportation system, etc. Generating the payment-related data information based on the voucher-related data is actually signing the account identifier of the user and the other related information by using the private key of the user and the private key of the public transportation system, where a character string obtained after the signing is the payment-related data information.

2. The application obtains the voucher-related data of the user from the server corresponding to the application, and generates the payment-related data information of the user based on the voucher-related data. In this case, the terminal device also needs to be in an online state.

3. The application locally obtains the pre-stored voucher-related data of the user, and generates the payment-related data information of the user based on the voucher-related data. In this case, the voucher-related data of the user is locally pre-stored by the application. When the application needs to generate the payment-related data information, the terminal device can be in an offline state.

It is worthwhile to note that the previous three methods for obtaining the payment-related data information can separately have different priorities. For example, the application can preferentially attempt to locally obtain the voucher-related data of the user. If the obtaining fails, the application can obtain the payment-related data information by using the other two methods.

In addition, public transportation systems in different places are independent of each other, and the management party of the application may cooperate with multiple different public transportation systems to obtain authorization of the multiple public transportation systems. Therefore, for each public transportation system, the application needs to transmit, to a collection device of the public transportation system, payment-related data information that is only applicable to taking a public transportation tool of the public transportation system.

Therefore, in implementations of the present specification, the collection device can send a public transportation system identifier stored in the collection device to the application by using the established NFC connection, and the application can transmit the payment-related data information of the user corresponding to the public transportation system identifier to the collection device by using the NFC connection. Specifically, the application can obtain the voucher-related data of the user corresponding to the public transportation system identifier, and then generate the payment-related data information based on the obtained voucher-related data.

In addition, to prevent the payment-related data information of the user from being intercepted by a malicious user when being transmitted to the collection device, causing leakage of sensitive information (such as privacy of the user), the application can encrypt the payment-related data information based on an encryption algorithm pre-agreed on with the public transportation system, to obtain encrypted information, and then transmit the encrypted information to the collection device. After receiving the encrypted information, the collection device can decrypt the encrypted information based on a decryption algorithm corresponding to the encryption algorithm, to obtain the payment-related data information for verification.

In addition, it is well known that sub-packet transmission can improve data transmission efficiency. In implementations of the present specification, to enable the collection device to imminently receive the payment-related data information transmitted by the application, the payment-related data information can be sent through sub-packet transmission.

Specifically, the collection device can first send a data offset to the application by using the NFC connection, and the application splits the payment-related data information into data packets based on the received data offset, and then transmits the data packets to the collection device. After receiving the data packets, the collection device assembles the received data packets into the payment-related data information based on the data offset.

The data offset received by the application is usually a natural number sequence (which can be referred to as an offset sequence) that starts with number 0. The data packets obtained by splitting the payment-related data information based on the offset sequence are also sequentially arranged, and there is a mapping relationship between a natural number and a data packet at the same rank.

More specifically, the application can split the payment-related data information into the data packets based on the received data offset by using the following method: The application can perform the following steps for natural numbers in the offset sequence sequentially based on an arrangement sequence of the natural numbers in the offset sequence:

For a natural number N, data from the (N+1)th unit to the Mth unit in the payment-related data information is encapsulated into one data packet, where M is a next natural number arranged behind the natural number N in the offset sequence, and the unit includes but is not limited to bit, character, byte, and another unit used to represent a data amount. If the natural number N is the last natural number in the offset sequence, data from the (N+1)th unit to the last unit in the payment-related data information is encapsulated into one data packet.

The collection device can assemble the data packets into the payment-related data information based on the data offset by using the following method: The collection device can sequentially concatenate the data packets corresponding to the natural numbers based on the arrangement sequence of the natural numbers in the offset sequence, to obtain the payment-related data information.

For example, if the offset sequence is "0, 3, 6", and the payment-related data information is "20180714", based on the offset sequence, for the first natural number 0, the application can encapsulate the first character "2" through the third character "1" of the payment-related data information into a data packet "201": for the second natural number 3, the application can encapsulate the fourth character "8" through the sixth character "7" of the payment-related data information into a data packet "807"; and for the third natural number 6, the application can encapsulate the seventh character "1" through the following character of the payment-related data information into a data packet "14". After receiving the data packets, the collection device can sequentially concatenate the data packet "201" corresponding to the natural number 0, the data packet "807" corresponding to the natural number 3, and the data packet "14" corresponding to the natural number 6 based on the arrangement sequence of the natural numbers in the offset sequence, to obtain the payment-related data information "20180714".

Further, after the application splits the payment-related data information to be transmitted into the data packets, the application can encrypt each data packet based on the encryption algorithm pre-agreed on with the public transportation system, to obtain an encrypted data packet corresponding to each data packet, and then transmit each encrypted data packet to the collection device by using the NFC connection. After receiving each encrypted data packet, the collection device can decrypt each encrypted data packet based on the decryption algorithm corresponding to the encryption algorithm, to obtain each data packet, and then assemble the data packets into the payment-related data information based on the data offset for verification.

In addition, in implementations of the present specification, the collection device can further send a verification result of the payment-related data information to the application by using the NFC connection, and the application can display the received verification result to prompt the user.

Figure 2:
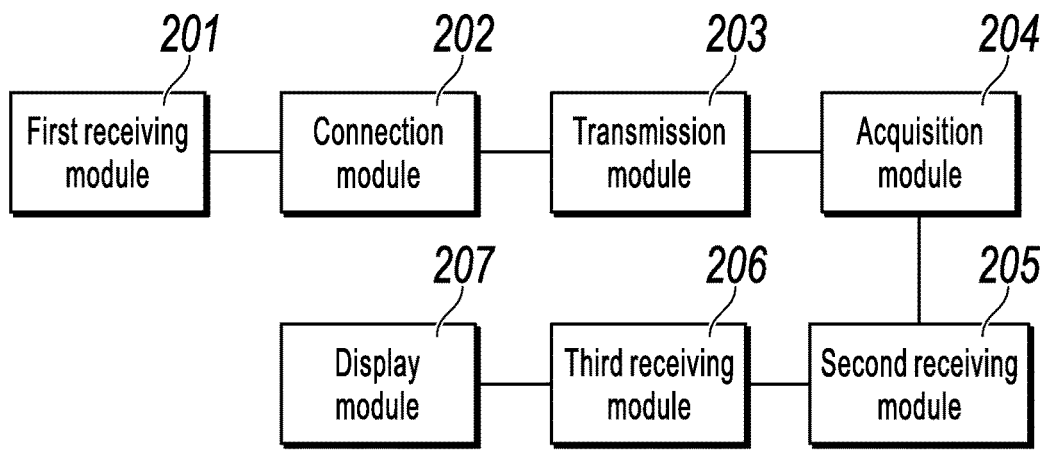
FIG. 2 is a schematic diagram illustrating a fare payment apparatus, according to an implementation of the present specification.

Based on the fare payment method shown in FIG. 1, implementations of the present specification further correspondingly provide a fare payment apparatus. As shown in FIG. 2, the apparatus is installed on a terminal device that supports host-based card emulation (HCE), and the apparatus includes: a first receiving module 201, configured to receive an HCE-based routing instruction sent by an operating system of the terminal device, where the routing instruction is sent by a collection device of a public transportation system to the terminal device: a connection module 202, configured to enable the apparatus to establish a near field communication (NFC) connection with the collection device in response to the routing instruction; and a transmission module 203, configured to transmit payment-related data information of a user to the collection device by using the NFC connection, so that the collection device deducts a fare from an account of the user based on the payment-related data information after verification on the received payment-related data information succeeds.

The apparatus further includes an acquisition module 204, configured to: before the transmission module 203 transmits the payment-related data information of the user to the collection device, obtain the payment-related data information of the user from a server corresponding to the apparatus: or obtain voucher-related data of the user from a server corresponding to the application, and generate the payment-related data information of the user based on the voucher-related data: or locally obtain pre-stored voucher-related data of the user, and generate the payment-related data information of the user based on the voucher-related data.

The apparatus further includes a second receiving module 205, configured to: before the transmission module 203 transmits the payment-related data information of the user to the collection device, receive, by using the NFC connection, a public transportation system identifier sent by the collection device; and the transmission module 203 is configured to transmit the payment-related data information of the user corresponding to the public transportation system identifier to the collection device.

The transmission module 203 is configured to encrypt the payment-related data information based on an encryption algorithm pre-agreed on with the public transportation system, to obtain encrypted information; and transmit the encrypted information to the collection device, so that the collection device decrypts the encrypted information based on a decryption algorithm corresponding to the encryption algorithm, to obtain the payment-related data information.

The apparatus further includes a third receiving module 206, configured to: before the transmission module 203 transmits the payment-related data information of the user to the collection device, receive, by using the NFC connection, a data offset sent by the collection device; and the transmission module is configured to split the payment-related data information into data packets based on the data offset; and transmit the data packets to the collection device, so that the collection device assembles the received data packets into the payment-related data information based on the data offset.

The apparatus further includes a display module 207, configured to receive, by using the NFC connection, a verification result that is of the payment-related data information and that is sent by the collection device, and display the verification result.

Figure 3:
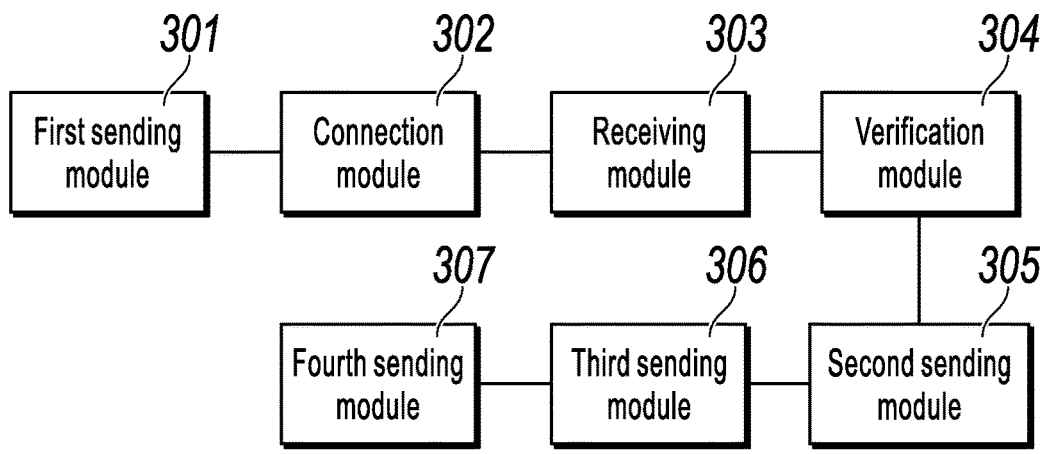
FIG. 3 is a schematic diagram illustrating another fare payment apparatus, according to an implementation of the present specification.

Based on the fare payment method shown in FIG. 1, implementations of the present specification further correspondingly provide another fare payment apparatus. As shown in FIG. 3, the apparatus includes: a first sending module 301, configured to send an HCE-based routing instruction to a terminal device, so that an operating system of the terminal device sends the routing instruction to an application installed on the terminal device based on an application identifier of the application included in the routing instruction: a connection module 302, configured to establish an NFC connection with the application in response to the routing instruction: a receiving module 303, configured to receive, by using the NFC connection, payment-related data information transmitted by the application; and a verification module 304, configured to verify the payment-related data information; and if the verification succeeds, deduct a fare from an account of a user based on the payment-related data information.

The apparatus further includes a second sending module 305, configured to: before the receiving module 303 receives the payment-related data information transmitted by the application, send a public transportation system identifier stored in the apparatus to the application by using the NFC connection, so that the application transmits the payment-related data information corresponding to the public transportation system identifier to the apparatus.

The receiving module 303 is configured to receive encrypted information transmitted by the application, where the encrypted information is obtained by the application by encrypting the payment-related data information of the user based on an encryption algorithm pre-agreed on with the apparatus; and decrypt the encrypted information based on a decryption algorithm corresponding to the encryption algorithm, to obtain the payment-related data information.

The apparatus further includes: a third sending module 306, configured to: before the receiving module receives the payment-related data information transmitted by the application, send a data offset to the application by using the NFC connection; and the receiving module is configured to receive data packets transmitted by the application, where the data packets are obtained by the application by splitting the payment-related data information of the user based on the data offset; and assemble the received data packets into the payment-related data information based on the data offset.

The apparatus further includes a fourth sending module 307, configured to send a verification result of the payment-related data information to the application by using the NFC connection, so that the application displays the verification result.

Figure 4:
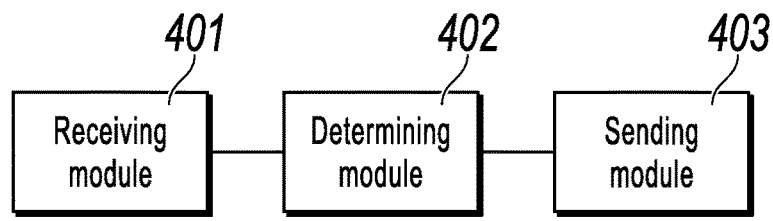
FIG. 4 is a schematic diagram illustrating another fare payment apparatus, according to an implementation of the present specification.

Based on the fare payment method shown in FIG. 1, implementations of the present specification further correspondingly provide another fare payment apparatus. As shown in FIG. 4, an application is installed on a terminal device that supports host-based card emulation (HCE), and the apparatus includes: a receiving module 401, configured to receive an HCE-based routing instruction sent by a collection device of a public transportation system: a determining module 402, configured to determine, based on an HCE function and an application identifier included in the routing instruction, the application that is installed on the terminal device and that corresponds to the application identifier; and a sending module 403, configured to send the routing instruction to the determined application, so that the application establishes a near field communication (NFC) connection with the collection device based on the routing instruction, and transmits payment-related data information of a user to the collection device by using the NFC connection, so that the collection device deducts a fare from an account of the user based on the payment-related data information after verification on the received payment-related data information succeeds.

Figure 5:
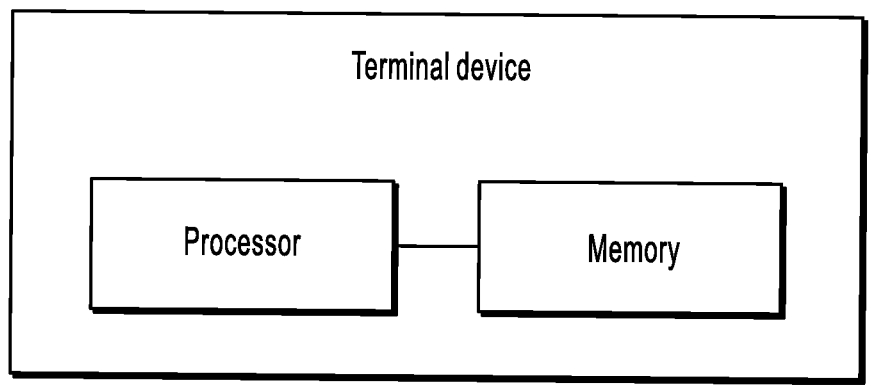
FIG. 5 is a schematic diagram illustrating a terminal device, according to an implementation of the present specification.

Based on the fare payment method shown in FIG. 1, implementations of the present specification further correspondingly provide a terminal device. As shown in FIG. 5, the terminal device supports HCE and the terminal device includes one or more processors and memories, the memories store programs, and the programs are configured to be executed by the one or more processors to perform the following steps: receiving a routing instruction sent by a collection device of a public transportation system: establishing a near field communication (NFC) connection with the collection device in response to the routing instruction; and transmitting payment-related data information of a user to the collection device by using the NFC connection, so that the collection device deducts a fare from an account of the user based on the payment-related data information after verification on the received payment-related data information succeeds.

Figure 6:
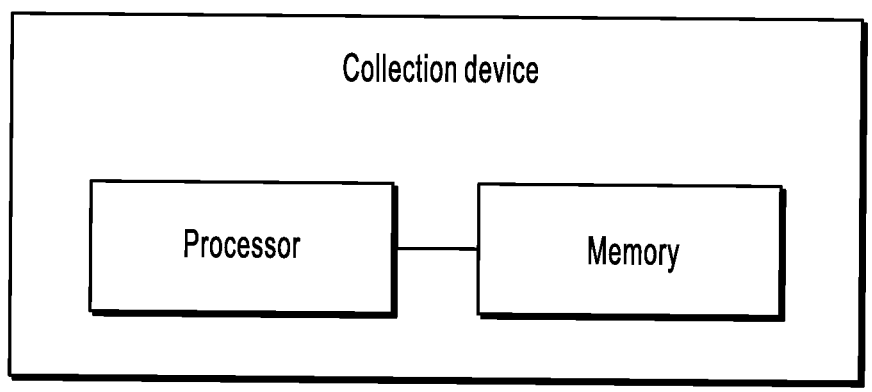
FIG. 6 is a schematic diagram illustrating a collection device, according to an implementation of the present specification.

Based on the fare payment method shown in FIG. 1, implementations of the present specification further correspondingly provide a collection device. As shown in FIG. 6, the device includes one or more processors and memories, the memories store programs, and the programs are configured to be executed by the one or more processors to perform the following steps: sending an HCE-based routing instruction to a terminal device, so that an operating system of the terminal device sends the routing instruction to an application installed on the terminal device based on an application identifier of the application included in the routing instruction: establishing an NFC connection with the application in response to the routing instruction: receiving, by using the NFC connection, payment-related data information transmitted by the application; and verifying the payment-related data information; and if the verification succeeds, deducting a fare from an account of a user based on the payment-related data information.

The implementations of the present specification are described in a progressive way. For same or similar parts of the implementations, mutual references can be made to the implementations. Each implementation focuses on a difference from other implementations. Especially, the devices shown in FIG. 5 and FIG. 6 are basically similar to method implementations, and therefore are described relatively briefly. For related parts, references can be made to some descriptions in the method implementations.

In the 1990s, whether a technical improvement is a hardware improvement (for example, an improvement to circuit structures, such as a diode, a transistor, or a switch) or a software improvement (an improvement to a method process) can be clearly distinguished. However, as technologies develop, current improvements to many method processes can be considered as direct improvements to hardware circuit structures. Almost all designers program an improved method process into a hardware circuit, to obtain a corresponding hardware circuit structure. Therefore, a method process can be improved by using a hardware entity module. For example, a programmable logic device (PLD) (for example, a field programmable gate array (FPGA)) is such an integrated circuit, and a logical function of the PLD is determined by a user through device programming. A designer performs programming to "integrate" a digital system into a single PLD, without requiring a chip manufacturer to design and manufacture a dedicated integrated circuit chip. In addition, at present, instead of manually manufacturing an integrated circuit chip, such programming is mostly implemented by using "logic compiler" software. The "logic compiler" software is similar to a software compiler used to develop and write a program. Original code needs to be written in a particular programming language before compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava. Lola, MyHDL, PALASM, and the Ruby Hardware Description Language (RHDL). The Very-High-Speed Integrated Circuit Hardware Description Language (VHDL) and Verilog are most commonly used at present. A person skilled in the art should also understand that a hardware circuit that implements a logical method process can be readily obtained provided that the method process is logically programmed by using several of the previous hardware description languages and is programmed into an integrated circuit.

A controller can be implemented by using any appropriate method. For example, the controller can be in a form a microprocessor or a processor, or a computer readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of the memory. A person skilled in the art also knows that, in addition to implementing the controller by using only the computer readable program code, method steps can be logically programmed to allow the controller to implement the same function in forms of the logic gate, the switch, the ASIC, the programmable logic controller, and the built-in microcontroller. Therefore, such controller can be considered as a hardware component, and an apparatus that is included in the controller and configured to implement various functions can also be considered as a structure in the hardware component. Alternatively, the apparatus configured to implement various functions can even be considered as both a software module implementing the method and a structure in the hardware component.

The system, apparatus, module, or unit illustrated in the previous implementations can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when being described, the previous apparatus is divided into various units based on functions for separate description. Certainly, when the present specification is implemented, functions of the units can be implemented in one or more pieces of software and/or hardware.

A person skilled in the art should understand that implementations of the present specification can be provided as a method, a system, or a computer program product. Therefore, the present specification can use a form of hardware only implementations, software only implementations, or implementations with a combination of software and hardware. Moreover, the present specification can use a form of a computer program product that is implemented on one or more computer-usable storage media (including but not limited to a magnetic disk memory, a CD-ROM, an optical memory, etc.) that include computer-usable program code.

The present specification is described with reference to the flowcharts and/or block diagrams of the method, the device (system), and the computer program product according to the implementations of the present specification. It is worthwhile to understand that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

Alternatively, these computer program instructions can be stored in a computer readable memory that can instruct a computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

Alternatively, these computer program instructions can be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computing device includes one or more processors (CPUs), input/output interfaces, network interfaces, and computer readable storage media.

The computer readable storage medium includes persistent, non-persistent, movable, and unmovable media that can store information by using any method or technology. The information can be a computer readable instruction, a data structure, a program module, or other data. Examples of the computer readable storage medium include but are not limited to a phase-change RAM (PRAM), a static RAM (SRAM), a dynamic RAM (DRAM), a RAM of another type, a ROM, an electrically erasable programmable read only memory (EEPROM), a flash memory or another memory technology, a compact disc read-only memory (CD-ROM), a digital versatile disc (DVD), or another optical storage, a cassette, a cassette magnetic disk storage, or another magnetic storage device, or any other non-transmission media. The computer readable storage medium can be configured to store information that can be accessed by a computing device. As defined in the present specification, the computer readable medium does not include computer readable transitory media such as a modulated data signal and a carrier.

It is worthwhile to further note that, the terms "include", "comprise", or their any other variants are intended to cover a non-exclusive inclusion, so that a process, a method, a product, or a device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

The present specification can be described in the general context of computer-executable instructions executed by a computer, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

What is claimed is:

1. A method for fare payment performed by a terminal device that supports host-based card emulation (HCE), wherein the method comprises:
   receiving an HCE-based routing instruction that includes an application identifier of an application installed on the terminal device from a fare collection device of a public transportation system;
   in response to the HCE-based routing instruction, establishing a near field communication (NFC) connection with the fare collection device, wherein establishing the NFC connection comprises establishing a connection to the application;
   receiving, from the fare collection device, and through the NFC connection, a public transportation system identifier that identifies the fare collection device;
   obtaining, from locally pre-stored voucher-related information, and by using the public transportation system identifier, voucher-related information of a user that corresponds to the public transportation system identifier, wherein the voucher-related information of the user comprises an account identifier of the user, serialized number of the public transportation system that acknowledges a validity of payment-related information, a validity period of the payment-related information, a private key of the user, and a private key of the public transportation system;
   generating payment-related information of the user based on the voucher-related information, wherein generating the payment-related information of the user comprises signing the account identifier of the user with the private key of the user and the private key of the public transportation system;
   transforming the payment-related information into multiple data packets;
   encrypting the multiple data packets based on an encryption algorithm that is agreed upon with the public transportation system to produce a respective encrypted data packet corresponding to each data packet; and
   transmitting, according to the public transportation system identifier, the respective encrypted data packets to the fare collection device through the NFC connection.

2. The method of claim 1, wherein the terminal device locally stores, at a local storage of the terminal device, different voucher-related information that is specific to different transportation systems.

3. The method of claim 1, wherein the encrypted data packets are decryptable by the fare collection device based on a decryption algorithm corresponding to the encryption algorithm.

4. The method of claim 1, wherein transforming, the payment-related information into the multiple data packets comprises:
   receiving, by using the NFC connection, a data offset sent by the fare collection device; and
   splitting the payment-related information into data packets based on the data offset.

5. The method of claim 1, further comprising:
   receiving, at the terminal device and by using the NFC connection, a verification result of the payment-related information that is sent by the fare collection device; and
   displaying the verification result on the terminal device.

6. A non-transitory, computer-readable medium storing one or more instructions that when executed by a computer system comprising a terminal device cause the computer system to perform operations for fare payment, wherein the terminal device supports host-based card emulation (HCE), and wherein the operations comprise:
   receiving an HCE-based routing instruction that includes an application identifier of an application installed on the terminal device from a fare collection device of a public transportation system;
   in response to the HCE-based routing instruction, establishing a near field communication (NFC) connection with the fare collection device, wherein establishing the NFC connection comprises establishing a connection to the application;
   receiving, from the fare collection device, and through the NFC connection, a public transportation system identifier that identifies the fare collection device;
   obtaining, from locally pre-stored voucher-related information, and by using the public transportation system identifier, voucher-related information of a user that corresponds to the public transportation system identifier, wherein the voucher-related information of the user comprises an account identifier of the user, serialized number of the public transportation system that acknowledges a validity of payment-related information, a validity period of the payment-related information, a private key of the user, and a private key of the public transportation system;

generating payment-related information of the user based on the voucher-related information, wherein generating the payment-related information of the user comprises signing the account identifier of the user with the private key of the user and the private key of the public transportation system;

transforming the payment-related information into multiple data packets;

encrypting the multiple data packets based on an encryption algorithm that is agreed upon with the public transportation system to produce a respective encrypted data packet corresponding to each data packet; and transmitting, according to the public transportation system identifier, the respective encrypted data packets to the fare collection device through the NFC connection.

7. The non-transitory, computer-readable medium of claim 6, wherein the terminal device locally stores, at a local storage of the terminal device, different voucher-related information that is specific to different transportation systems.

8. The non-transitory, computer-readable medium of claim 6, wherein the encrypted data packets are decryptable by the fare collection device based on a decryption algorithm corresponding to the encryption algorithm.

9. The non-transitory, computer-readable medium of claim 6, wherein the operations further comprise:

receiving, at the terminal device and by using the NFC connection, a verification result of the payment-related information that is sent by the fare collection device; and displaying the verification result on the terminal device.

10. The non-transitory, computer-readable medium of claim 6, wherein transforming the payment-related information into the multiple data packets comprises:

receiving, by using the NFC connection, a data offset sent by the fare collection device; and splitting the payment-related information into data packets based on the data offset.

11. A computer-implemented system, comprising:

a terminal device that supports host-based card emulation (HCE), wherein the terminal device comprises one or more computers and comprise one or more computer memory devices interoperably coupled with the one or more computers and having tangible, non-transitory, machine-readable media storing one or more instructions that, when executed by the one or more computers, perform one or more operations for fare payment, wherein the operations comprise:

receiving an HCE-based routing instruction that includes an application identifier of an application installed on the terminal device from a fare collection device of a public transportation system;

in response to the HCE-based routing instruction, establishing a near field communication (NFC) connection with the fare collection device, wherein establishing the NFC connection comprises establishing a connection to the application;

receiving, from the fare collection device, and through the NFC connection, a public transportation system identifier that identifies the fare collection device;

obtaining, from locally pre-stored voucher-related information, and by using the public transportation system identifier, voucher-related information of a user that corresponds to the public transportation system identifier, wherein the voucher-related information of the user comprises an account identifier of the user, serialized number of the public transportation system that acknowledges a validity of payment-related information, a validity period of the payment-related information, a private key of the user, and a private key of the public transportation system;

generating payment-related information of the user based on the voucher-related information, wherein generating the payment-related information of the user comprises signing the account identifier of the user with the private key of the user and the private key of the public transportation system;

transforming the payment-related information into multiple data packets;

encrypting the multiple data packets based on an encryption algorithm that is agreed upon with the public transportation system to produce a respective encrypted data packet corresponding to each data packet; and transmitting, according to the public transportation system identifier, the respective encrypted data packets to the fare collection device through the NFC connection.

12. The computer-implemented system of claim 11, wherein the terminal device locally stores, at a local storage of the terminal device, different voucher-related information that is specific to different transportation systems.

13. The computer-implemented system of claim 11, wherein the encrypted data packets are decryptable by the fare collection device based on a decryption algorithm corresponding to the encryption algorithm.

14. The computer-implemented system of claim 11, wherein the operations further comprise:

receiving, at the terminal device and by using the NFC connection, a verification result of the payment-related information that is sent by the fare collection device; and displaying the verification result on the terminal device.

15. The computer-implemented system of claim 11, wherein transforming the payment-related information into the multiple data packets comprises:

receiving, by using the NFC connection, a data offset sent by the fare collection device; and splitting the payment-related information into data packets based on the data offset.

* * * * *